United States Patent [19]
Zuk, Jr.

[11] Patent Number: 5,948,246
[45] Date of Patent: *Sep. 7, 1999

[54] VACUUM FILTRATION DEVICE

[76] Inventor: Peter Zuk, Jr., 258 Old Littleton Rd., Harvard, Mass. 01451

[ * ] Notice: This patent is subject to a terminal disclaimer.

[21] Appl. No.: 08/104,339

[22] Filed: Aug. 9, 1993

Related U.S. Application Data

[63] Continuation-in-part of application No. 07/811,473, Dec. 19, 1991, Pat. No. 5,234,585.

[51] Int. Cl.$^6$ ................................................. B01D 29/085
[52] U.S. Cl. .......................... 210/188; 210/232; 210/247; 210/406; 210/416.1; 210/436; 210/450; 210/472; 210/474; 210/477; 422/101
[58] Field of Search ..................... 210/188, 406, 210/416.1, 418, 419, 428, 436, 450, 451, 467, 472, 474, 477, 232, 247, 248; 422/101

[56] References Cited

U.S. PATENT DOCUMENTS

| | | | |
|---|---|---|---|
| D. 297,860 | 9/1988 | Leoncavallo et al. | D24/8 |
| 3,469,369 | 9/1969 | Helmke | 210/406 |
| 3,478,889 | 11/1969 | Fessler | 210/406 |
| 3,956,125 | 5/1976 | Strutt et al. | 210/406 |
| 4,052,163 | 10/1977 | Patzner | 210/477 |
| 4,247,399 | 1/1981 | Pitesky | 210/406 |
| 4,301,010 | 11/1981 | Eddleman et al. | 422/101 |
| 4,394,266 | 7/1983 | Mehra et al. | 210/244 |
| 4,673,501 | 6/1987 | Wells et al. | 210/406 |
| 4,678,572 | 7/1987 | Hehl | 210/232 |
| 4,678,576 | 7/1987 | Leoncavallo | 210/433 |
| 4,689,147 | 8/1987 | Leoncavallo et al. | 210/232 |
| 4,702,834 | 10/1987 | Relyea | 210/321 |
| 4,783,318 | 11/1988 | Lapakko | 422/101 |
| 4,792,398 | 12/1988 | Klein | 210/406 |
| 4,894,155 | 1/1990 | Leoncavallo et al. | 210/321 |
| 5,141,639 | 8/1992 | Kraus et al. | 210/321 |
| 5,234,585 | 8/1993 | Zuk | 210/188 |

FOREIGN PATENT DOCUMENTS

| | | |
|---|---|---|
| 403858 | 10/1924 | Germany . |
| 2250927 | 6/1992 | United Kingdom . |

*Primary Examiner*—Peter A. Hruskoci

[57] ABSTRACT

The vacuum filtration device has a disposable filter funnel and a disposable filtrate receptacle. The funnel and receptacle are used with a reusable base that is connected to a vacuum source. When the receptacle and funnel are mounted on the base the vacuum is applied through a connecting passage to the receptacle to draw the filtrate from the funnel into the receptacle.

65 Claims, 13 Drawing Sheets

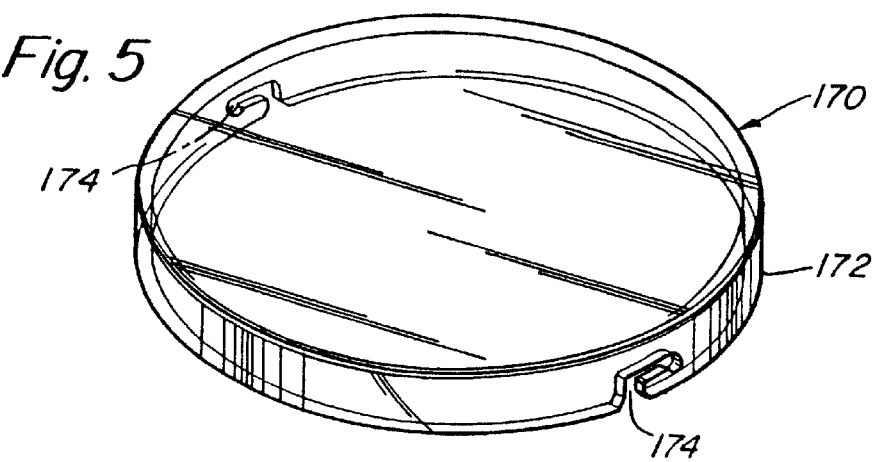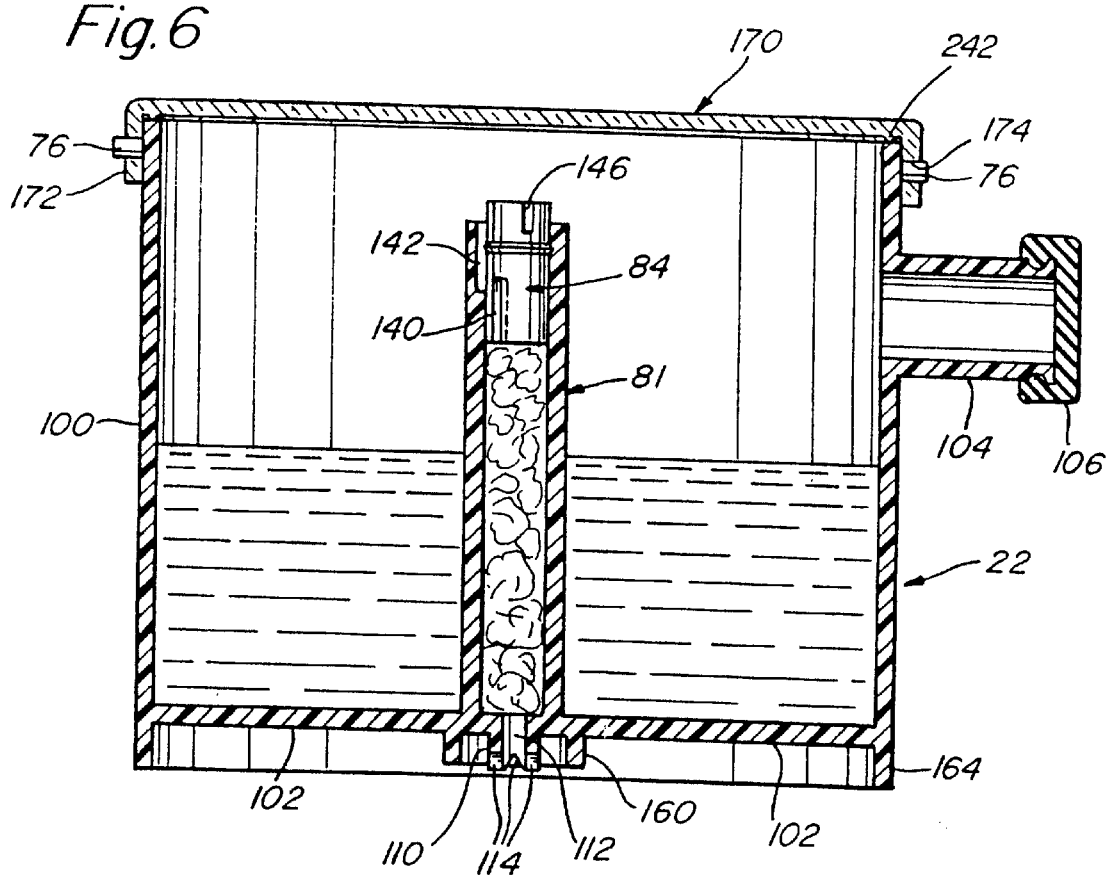

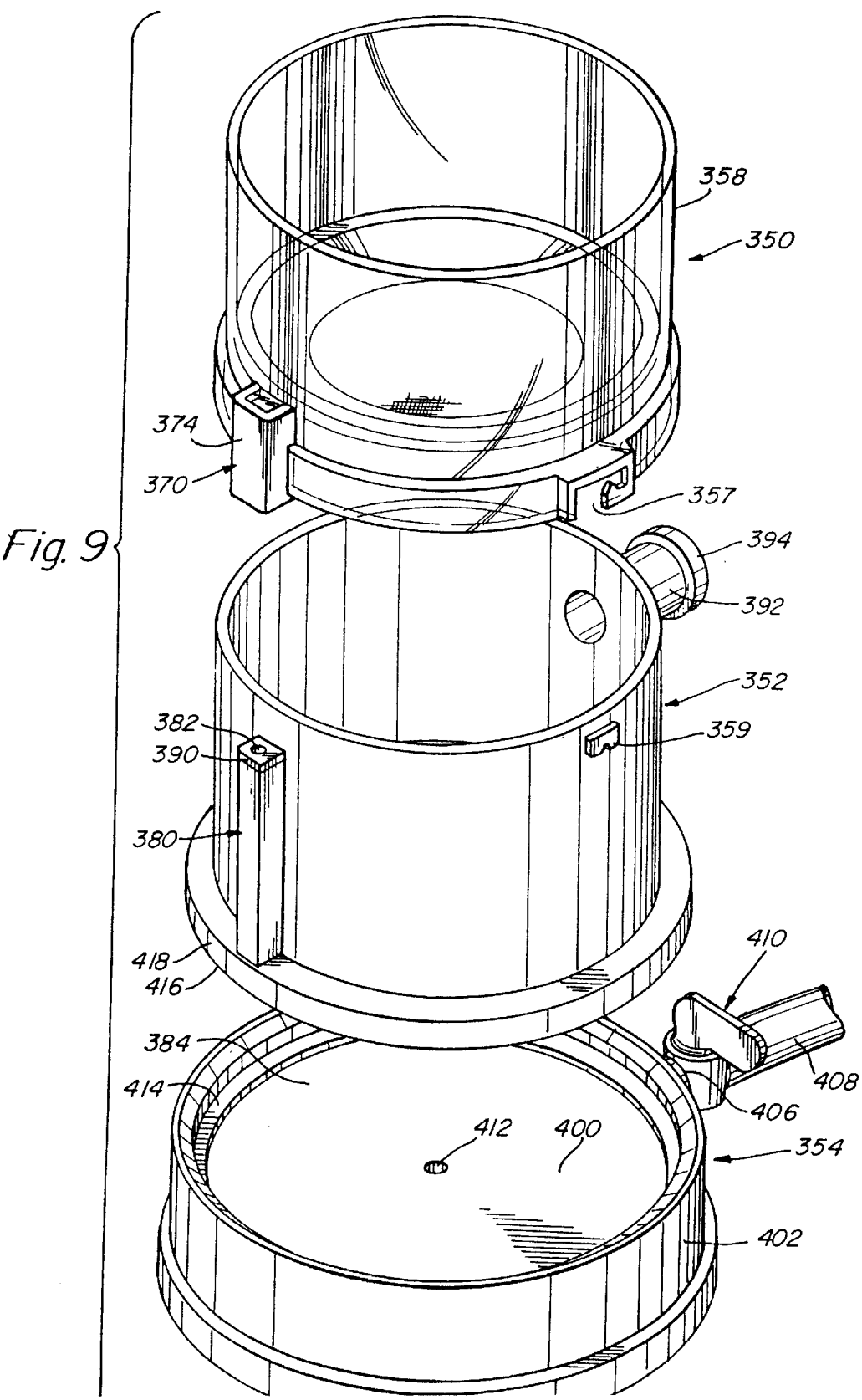

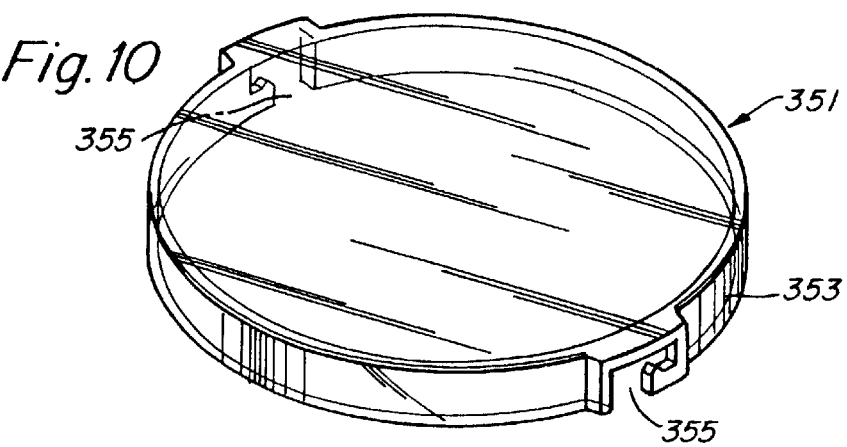
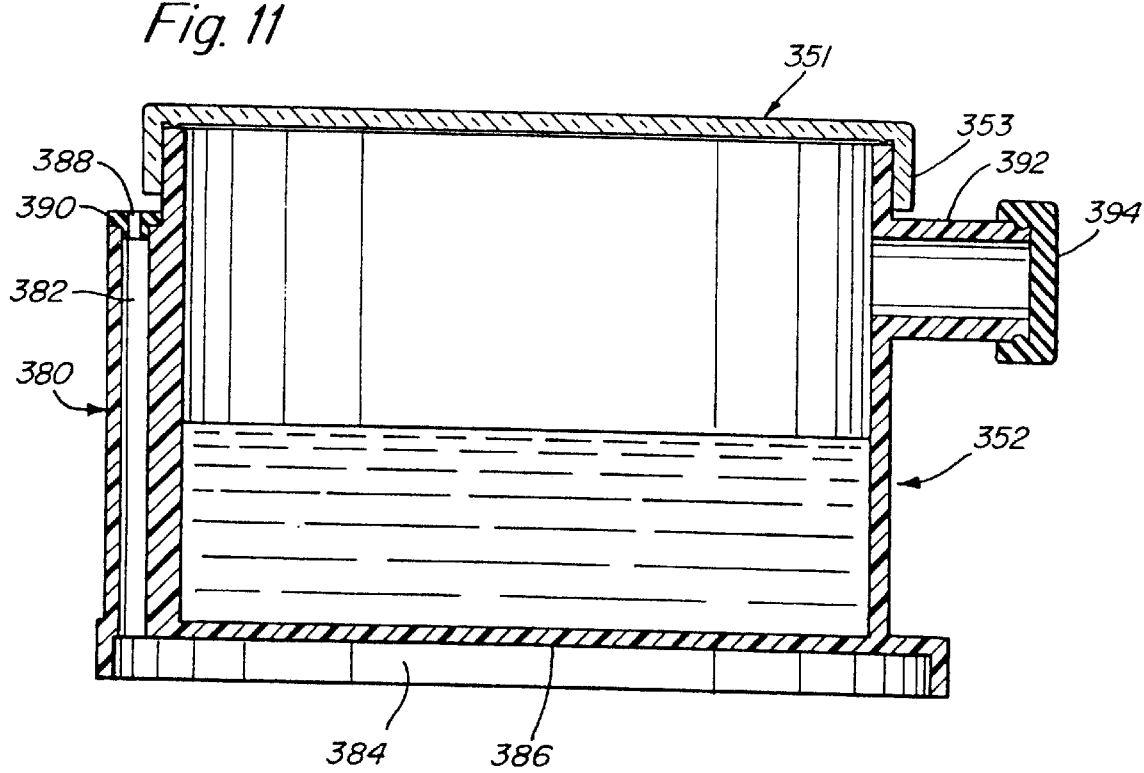

VACUUM FILTRATION DEVICE

This application is a continuation-in-part of application Ser. No. 07/811,473, filed on Dec. 19, 1991, now U.S. Pat. No. 5,234,585 issued Aug. 10, 1993, entitled "Vacuum Filtration Device." The content of this parent application is hereby expressly incorporated by reference.

FIELD OF THE INVENTION

This invention relates generally to liquid filtration devices which use the differential pressure between atmospheric pressure and a vacuum as a driving force to perform the filtration. More particularly, this invention relates to a vacuum driven liquid filtration device that is disposable.

BACKGROUND

At the present time, there are many disposable liquid filtration systems available that use vacuum as a driving force. All of these devices, however, require that the vacuum hose be directly connected to the disposable device. Consequently, the vacuum hose must be repeatedly connected and disconnected from the system as successive filtrations are performed. Such devices are inherently unstable when a vacuum hose is attached to them because the devices are lightweight and in many instances the hose connection to the filtrate receptacle is at an elevated level. The instability of these devices is aggravated when the vacuum hose is twisted. Frequently, to avoid tipping during filtration a user will place a weight on top of the device or simply stabilize the system by hand.

SUMMARY OF THE INVENTION

The principle object of the present invention is to overcome the shortcomings of the prior art. According to the invention, a vacuum filtration device is provided. The vacuum filtration device includes a disposable filtration receptacle for receiving filtrate, a disposable funnel having a filter for receiving the liquid to be filtered which is disposed above the filtration receptacle and which has openings below the filter for directing filtrate from the funnel to the filtration receptacle, and a reusable base releasably supporting the filtration receptacle and having an opening through which a vacuum may be applied to the base. The base is disposed below the filtration receptacle and is operatively connected to the interior of the filtration receptacle so that the vacuum df the base may be applied to the filtration receptacle to draw liquid from the funnel through the filter into the filtration receptacle. This operative connection may be a connecting passage.

In one embodiment of the invention, the operative connection between the base and the filtration receptacle contains filtration media. As an alternative, the invention may have a second filter which is disposed above the tube in the filtration receptacle and is sealed to the tube.

In another embodiment of the invention, the vacuum filtration device includes means for preventing the vacuum applied to the base from sucking the filtrate which enters the filtration receptacle into the base. Preferably, this means is a barrier, and most preferably the barrier is a baffle, which is on the funnel or the filtration receptacle. This means also can be the openings in the funnel below the filter, in which the openings comprise a configuration of slots in a portion of the periphery of the funnel. In this configuration, no such slots are present in the funnel directly above the passage connecting the filtration receptacle to the base, so that the filtrate does not drip into the passage.

Variations of the vacuum filtration device of this invention include application of the vacuum to the filtration receptacle through a tube that extends upwardly from the bottom of the receptacle. In one embodiment, a poppet valve in the passage between the base and the filtration receptacle is opened when the filtration receptacle is placed on the base. In another embodiment, a cylinder valve is contained in the passage between the base and the filtration receptacle for opening and closing the passage, and is opened and closed in response to rotation of the funnel on the filtration receptacle.

Other variations include a low pressure line operatively connected to the opening in the base in which the operative connection may contain filtration media, a pour spout on the filtration receptacle, and a base which is weighted. Preferably, the funnel is held above the filtration receptacle, and the base supports the filtration receptacle, by connections formed by the applied vacuum. In another variation, the funnel is integral with the filtration receptacle.

The invention also provides for funnel/receptacle filtration modules which include a disposable filtration receptacle and a disposable funnel in any of the embodiments described for the vacuum filtration device. Preferably, the funnel is integral with the filtration receptacle in these modules.

These and other objects and features of this invention will be better understood and appreciated from the following detailed description of several embodiments thereof, selected for purposes of illustration and shown in the accompanying drawings.

BRIEF FIGURE DESCRIPTIONS

FIG. 5 is a perspective view of the cover of the filtrate receptacle of the assembly shown in FIG. 1;

FIG. 6 is a cross-sectional view of the filtration receptacle forming the middle unit of the assembly of FIG. 1 and with the cover of FIG. 5 in place;

FIG. 9 is an exploded perspective view of the assembly shown in FIG. 8;

FIG. 10 is a perspective view of the cover of the filtration receptacle of the assembly shown in FIG. 8;

FIG. 11 is a cross-sectional view of the filtration receptacle forming the middle unit of the assembly of FIG. 8 and with the cover of FIG. 10 in place;

DETAILED DESCRIPTION

Figure 1:
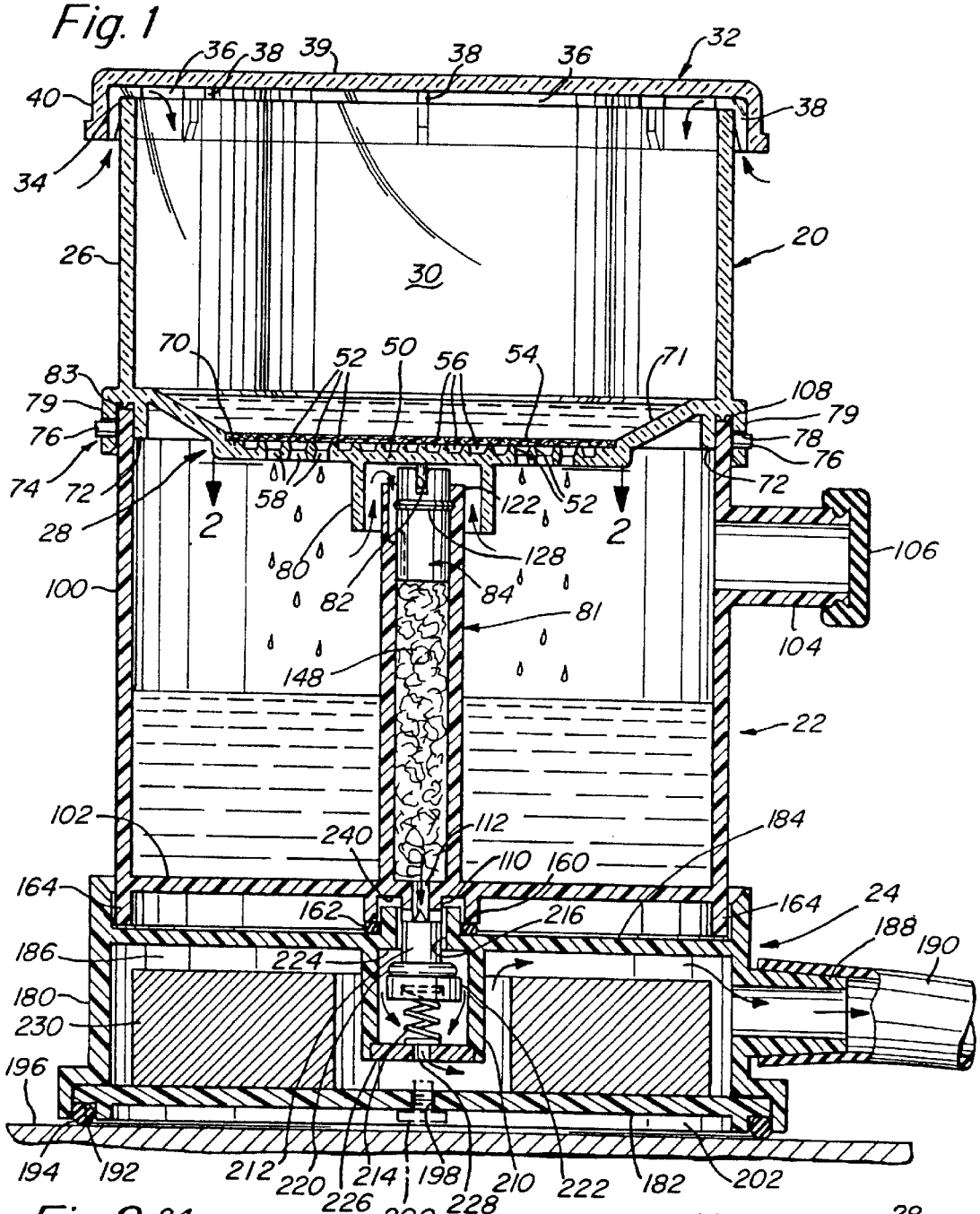
FIG. 1 is a vertical cross-section through one embodiment of a vacuum filtration device constructed in accordance with this invention.
Figure 2:
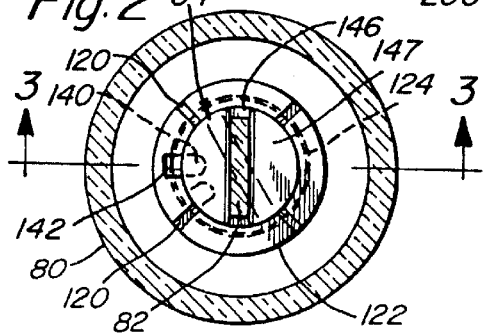
FIG. 2 is a horizontal cross-sectional view taken along with section line 2—2 in FIG. 1.

The liquid filtration device comprising the present invention includes three major components, namely a filter funnel 20, a filtration receptacle 22 and a base 24. In the preferred embodiments of the present invention, the filter funnel 20 and filtration receptacle 22 are disposable while the base 24 is reusable. The funnel 20 receives the liquid to be processed in the device, the filtration receptacle 22 collects the filtrate processed by it, and the base 24 applies a vacuum to the device to accelerate the system operation. These various parts are described separately under appropriate headings below.

THE EMBODIMENT OF FIGS. 1–6

Filter Funnel 20

The funnel 20 includes a generally cylindrical side wall 26 and a generally horizontal bottom wall 28 that together define funnel chamber 30 into which the liquid to be filtered is poured. A vented removable cover 32 rests on the top edge 34 of the cylindrical side wall 26 and serves as a dust cover for chamber 30.

The cover 32 as shown in FIG. 1 includes vent passages 36 formed by the spaces between ribs 38 on the lower surface of the horizontal wall 39 and inner surface of skirt 40 of the cover. It is evident in FIG. 1 that vent passages 36 place chamber 30 in communication with the surrounding atmosphere so as to maintain atmospheric pressure in the funnel 20.

The flat central portion 50 of bottom wall 28 of filter funnel 20 carries an array of pins 52 or other support structure designed to support a membrane filter 54 that rests on them adjacent the bottom of the funnel chamber 30. The pins 52 are spaced apart so as to define a number of channels 56, all of which are in flow communication with the openings 58 that extend through the bottom wall 28 of the filter funnel. Obviously, the arrangement of the pins 52 may take a variety of different forms, but they must be capable of supporting the membrane filter 54 without puncturing it and must also define passages which communicate with the openings 58.

A shoulder 70 is provided at the periphery of the flat central portion 50 of bottom wall 28, and the membrane filter 54 may be heat-sealed or otherwise secured to the shoulder so as to prevent liquid in chamber 30 from seeping about the periphery of the filter into the channels 56 without being subject to the filtering action of the membrane. The bottom wall 28 slopes downwardly at its periphery 71 to direct liquid in the chamber 30 to the upper surface of the membrane 54.

Figure 4:
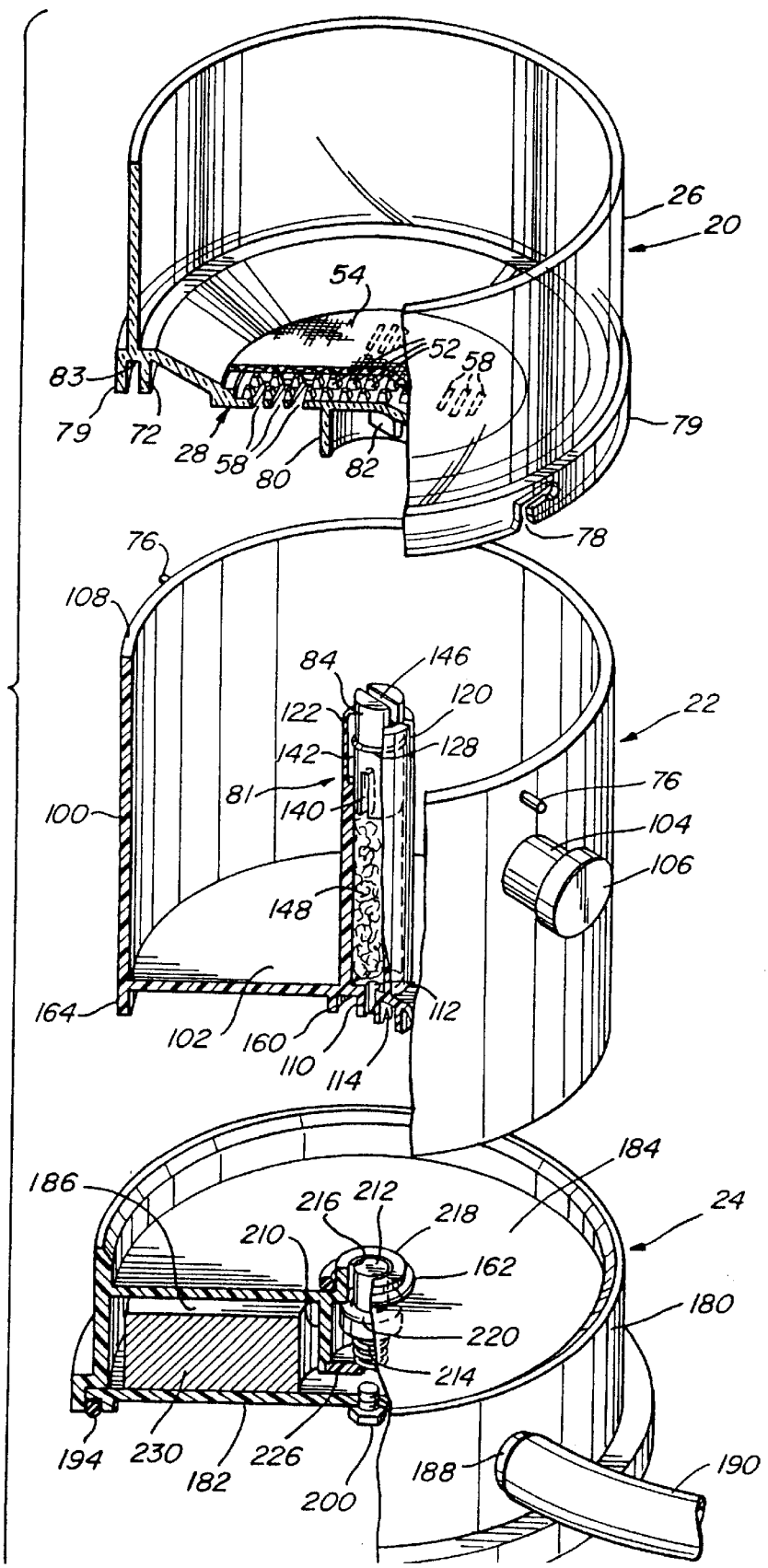
FIG. 4 is an exploded perspective view of the assembly shown in FIG. 1 with parts broken away to show the interior thereof.

The funnel 20 at the lower end of side wall 26 and the periphery of bottom wall 28 carries a downwardly extending inner collar 72 that fits just within the upper end of the side wall of the filtrate receptacle 22. The funnel 20 is captured on the receptacle 22 by bayonet connections 74 each comprising a pin 76 and slot 78 as shown in FIGS. 1 and 4. The slots 78 are provided in outer collar 79 spaced from the collar 72. The space between them forms a slot that receives the upper edge of the receptacle side wall. As shown in FIG. 1, a downwardly extending bead 83 is also molded in the slot to form a seal with the top edge of the side wall of the receptacle 22.

The bottom wall 28 of the funnel also carries a barrier, preferably a baffle, and most preferably a generally cylindrical baffle 80 that extends downwardly from the lower surface of bottom wall 28 and surrounds a center tube 81 of the filtration receptacle described more fully below. As an alternative, as is noted below, the barrier may be carried by the funnel. It will be noted in FIG. 1 that the openings 58 in the bottom wall 28 of the funnel lie radially outside the baffle 80. This arrangement prevents filtrate from dripping from the funnel 20 into the center tube 81.

Within the baffle 80 and also mounted on the lower surface of bottom wall 28 of funnel 20 is a key 82 that is designed to engage a cylinder valve 84 mounted in the top of the center tube 81 of the filtration receptacle. The physical interrelationship of the funnel 20 and receptacle 22 will be made clear in the description of the filtration receptacle 22.

Filtration Receptacle 22

Filtration receptacle 22 includes a generally cylindrical side wall 100 and a bottom wall 102. A pouring spout 104 with a removable spout cover 106 is provided in the side wall 100. The pouring spout 104 is conveniently positioned to pour filtrate from the receptacle.

The center tube 81 which in the embodiment of FIGS. 1–6 is coaxial with side wall 100 extends upwardly from bottom wall 102 and terminates just below the plane of the top edge 108 of the cylindrical wall 100. Coaxial with the center tube 81 and extending downwardly from the lower surface of bottom wall 102 is a lower center tube 110. Tubes 81 and 110 are molded as an integral part of the filtration receptacle 22. A port 112 extends through the bottom wall 102 and tube 110 and defines a passage from the interior of center tube 81 to the region below the receptacle. Slots 114 are formed in the lower edge of the lower tube 110 to open a passage from the center tube 81 to the exterior of the receptacle 22 for reasons made clear below.

The top end of center tube 81 has a plurality of longitudinally extending expansion slots 120 about its top edge 122. A peripheral groove 124 is also formed on the inside of the center tube 81 above the bottoms of slots 120, which groove receives the circular rib 128 on the outer surface of cylinder valve 84 mounted in the upper end of the tube 81. The slots 120 allow the upper end of the tube 81 to expand when the cylinder valve 84 is being mounted in the tube and as the rib 128 approaches the groove 124. The slots 120 extend below the peripheral groove 124 so as to provide sufficient flexibility in the tube to enable it to expand as the cylinder valve 84 is inserted.

Figure 3:
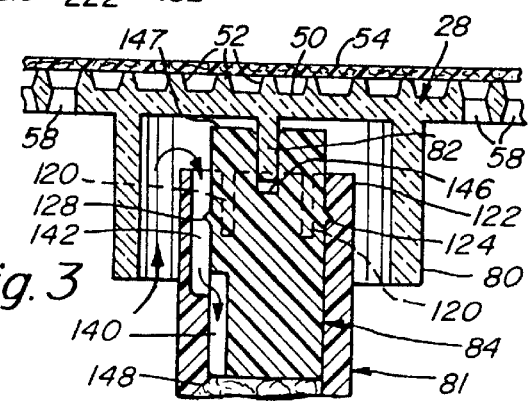
FIG. 3 is a fragmentary cross-sectional view taken along the section line 3—3 in FIG. 2.

As shown particularly in FIG. 3, a longitudinally extending groove 140 is provided in the body of cylinder valve 84, and the groove 140 overlaps and communicates with a similar groove 142 on the inner surface of the center tube 81 at its upper end 122. The grooves 140 and 142 when in communication with one another provide a passage from the interior of the filtration receptacle 22 to the vacuum base 24 as is explained more fully below.

Cylinder valve 84 has a transverse slot 146 in its upper end 147, which receives key 82 carried on the lower surface of the bottom wall 28 of funnel 20. The engagement of the key and slot causes the funnel 20 and cylinder valve 84 to rotate together when the funnel is turned in position on the filtration receptacle 22. This relationship enables the cylinder valve passage defined by the slots 140 and 142 in the cylinder valve body and upper end of the tube 81 to be opened and closed by the user of the system by rotation of the filter funnel 20. In FIG. 3, the cylinder valve is in the open position with the slots circumferentially aligned and when the funnel 20 is rotated a few degrees so as to move slot 140 out of registration with the slot 142, the cylinder valve is closed as in FIG. 6.

Below cylinder valve 84, center tube 81 contains filtration media 148. The media may be cotton, porous plastic, or any other suitable material, and it may also be hydrophobic. Cylinder valve 84 captures the filtration media 148 in center tube 81 while the small diameter port 112 communicating with the bottom of center tube 81 prevents vacuum applied to the center tube from drawing the filtration media out of it.

A small diameter collar 160 extends downwardly from the bottom wall 102 of receptacle 22 and surrounds the lower tube 110. Collar 160 is sized to engage an O-ring 162 carried on the top wall of the base 24 to form a seal therewith as is explained more fully in the description below. A second larger diameter collar 164 extends downwardly from the lower wall 102 of the receptacle 22 and serves as a base for it when the receptacle is stored. However, the outer collar 164 does not interfere with the formation of the seal between the inner collar 160 and O-ring 162 when the filtration receptacle 22 is mounted on base 24.

A clear filtration receptacle cover 170 is shown in FIGS. 5 and 6. It is used to close the receptacle 22 when the funnel 20 is removed. The flange 172 of the receptacle cover 170 has cam slots 174 identical to the slots 78 in the funnel, and the slots 174 form with pins 76 a bayonet lock for the receptacle cover 170 when it is used to close the receptacle 22.

Vacuum Base 24

Vacuum base 24 has a side wall 180, bottom wall 182 and top wall 184 that together define vacuum chamber 186. A nipple 188 on cylindrical wall 180 provides means for connecting a vacuum hose 190 to the base so as to impose a vacuum on the chamber 186. Bottom wall 182 of the base may be bonded to the cylindrical wall 180, and a groove 192 may be provided at the junction of the bottom wall 182 and side wall 180 to receive a flexible ring 194. The flexible ring 194 may form a seal with the supporting surface 196 of a table or other support, and a passage 198 controlled by a seal screw 200 enables a low-pressure chamber 202 to be formed between surface 196 and bottom wall 182 when seal screw 200 is cracked or removed and when vacuum is applied to the vacuum chamber 186 so as to secure base 24 firmly on surface 196.

A valve body 210 in the form of an annular collar extends downwardly from the top wall 184 of the base 24 and contains a poppet valve 212 which moves axially in body 210 and which is biased to a raised position in the body by spring 214. Poppet valve 212 opens and closes the port 216 in the top wall 184 and in part defined by the upstanding valve guide 218. O-ring 220 carried on the lower flange 222 of poppet valve 212 seals against the lower surface 224 of the top wall 184 about the periphery of port 216 when the poppet valve is elevated so as to seal the port 216. When the poppet valve is depressed as shown in FIG. 1, the port 216 opens as the O-ring 220 separates from sealing surface 224.

Valve body 210 is closed at its lower end by a bottom cover 226 which, in turn, is provided with a small port 228.

In the embodiment shown in FIG. 1, base 24 is provided with a weight 230 disposed in chamber 186. Weight 230 is placed in chamber 186 before the bottom wall 182 is bonded to the side wall 180 and provides stability to the system.

When a vacuum is applied through hose 190 to chamber 186, the chamber is evacuated. The diameter of poppet valve 212 and the force of spring 214 are selected so that when the vacuum is applied to the interior of valve body 210 through port 228, the vacuum is not strong enough to overcome the force of the spring and the O-ring 220 remains sealed against the surface 224. Consequently, the chamber 186 remains sealed. Poppet valve 212, however, is opened by the lower tube 110 when the receptacle is mounted on the base 24. As seen in FIG. 1, the lower end of lower tube 110 engages the upper surface of poppet valve 212 and displaces it downwardly against the bias of spring 214 so as to unseat O-ring 220 from sealing surface 224.

Assembly of Funnel 20, Filtration Receptacle 22 and Vacuum Base 24

The funnel 20 is connected to the top of receptacle 22 by means of the bayonet lock composed of pins 76 and slots 78, to releasably retain the funnel in place with the upper edge of the filtrate receptacle side wall 100 engaging the bead 83. When the funnel 20 is mounted on receptacle 22, the key 82 carried on the lower surface of bottom wall 28 of the funnel registers with the slot 146 in the top surface of the cylinder valve 84. This connection causes cylinder valve 84 to rotate with rotation of the funnel 20 so that the valve may be conveniently opened and closed by the user of the system.

The filtration receptacle 22, in turn, is mounted on the vacuum base 24 by locating the outer collar 164 within the top of the side wall 180 of the base. This action automatically aligns the inner collar 160 with the O-ring 162. The lower end of the bottom tube 110 at the same time unseats the poppet valve 212. Consequently, the vacuum chamber 186 in base 24 is placed in communication with the interior of filtration receptacle 22 through port 228, valve body 210, poppet valve 212, notches 114, passage 112 in bottom wall 102 of the filtration receptacle, center tube 81, and aligned grooves 140 and 142 controlled by cylinder valve 84 which, in turn, is moved to the open position by virtue of the control imposed on it by the funnel 20. Communication between the vacuum chamber 186 in base 24 and the interior of filtration receptacle 22 may be interrupted by turning the funnel 20 so as to misalign the grooves 140 and 142 and thereby close the cylinder valve 84 at the top of center tube 81. The filtration media 148 in the center tube 81 beneath cylinder valve 84 filters any air that may enter the filtration receptacle 22 when the vacuum is relieved. The media 148 also filters any air that may enter center tube 81 through port 112 when liquid is poured from the filtration receptacle 22 through spout 104.

As described, when the filtration receptacle 22 is placed on the base 24, the inner collar 160 engages the O-ring 162 to form a seal. The surface area 240 inside the inner collar 160 is sufficiently large so that the force of the vacuum imposed on the surface by virtue of the open poppet valve 212 is sufficient to overcome the force of spring 214 acting in the opposite direction urging the base of filtration receptacle 22 upwardly off the vacuum base 24. However the surface 240 is not so large as to make it difficult to remove the filtration receptacle 22 while the vacuum is applied to chamber 186. Therefore, in operation, the base 24 may be maintained in the "on" condition with vacuum imposed on it through hose 190 and nipple 188 when the system is in use and the receptacle is periodically removed from the base to pour out its contents.

To perform a filtration operation, the filtration receptacle 22 with the funnel 20 is placed on the base, and liquid to be filtered is poured into the funnel by temporarily removing its vented cover 32. The unit is then momentarily pushed down on the base 24. Vacuum is applied to the system from hose 190 through poppet valve 212, and the liquid in funnel 20 will be drawn through membrane 54 and flow via channels 56 and ports 58 into the receptacle. After the filtration is completed, the user simply removes the funnel 20 and filtration receptacle 22 from the base, and the poppet valve 212 will automatically close the base vacuum chamber 186. The baffle 80 that surrounds the top of the center tube 81 prevents the vacuum applied to the system from sucking filtration which enters the receptacle 22 into the center tube. The cam slots 78 in the funnel 20 may be positioned and sized so as to insure that the cylinder valve 84 is in the open position when the funnel 20 is mounted on the receptacle 22. Similarly, when the funnel is removed, the slots 78 may insure that the cylinder valve 84 is closed.

To store the sterilized device and maintain sterility the funnel 20 can be removed and replaced with a pre-sterilized receptacle cover 170 as shown in FIG. 6. Since the receptacle cover 170 has no key 82 the cylinder valve 84 will remain closed with receptacle cover 170 locked in place on receptacle 22. To assure sterility this operation should be performed in a laminar flow hood.

The assembly described is inherently stable because the vacuum hose 190 is connected to the base 24 very close to the table surface 40, and the stability is increased by the weight 230 disposed in the base. The weight, of course, may be made of any material and preferably is substantial so as to greatly enhance the stability of the system. The stability may be further increased by cracking or removing the seal screw 200 in bottom wall 182 of the base so that the vacuum is imposed on the lower surface of the bottom wall and the chamber 202 beneath it, which is sealed by the O-ring 194 engaging the surface 196. When the vacuum is turned off, the base can, of course, be readily moved.

THE EMBODIMENT OF FIG. 7

Figure 7:
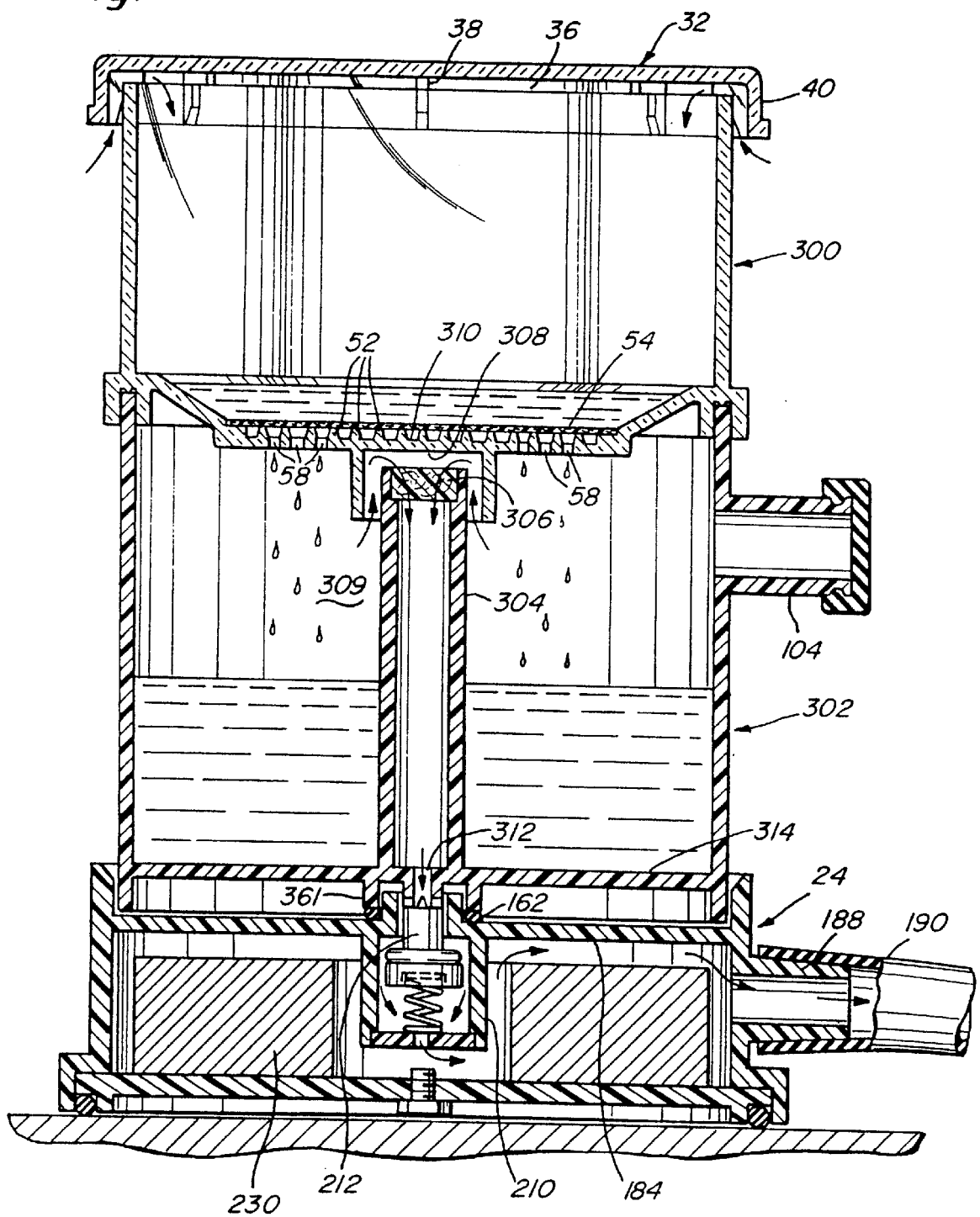
FIG. 7 is a cross-sectional elevation view of a second embodiment of the vacuum filtration device.

The embodiment of the invention illustrated in FIG. 7 differs from the embodiment of FIGS. 1–6 principally in the relationship between the funnel and filtration receptacle. In this embodiment, the filter funnel 300 is permanently sealed to the filtration receptacle 302 and the cylinder valve at the top of the center tube 304 has been eliminated. Because the funnel and filtration receptacle are permanently sealed together, there is no need for a cylinder valve such as in the first embodiment to close the top of the center tube. In place of the cylinder valve, filtration media 306 is provided in the center tube 304, and the media 306 cannot fall from the top of the tube into the chamber 309 of the receptacle 302 because of the close spacing between the top of the center tube and the lower surface 308 of bottom wall 310 of funnel 300. If the filtration media 306 is hydrophobic, it will prevent liquid from entering the center tube 304 if the device is accidentally tipped over during storage or when filtrate is poured from the chamber 309 of the receptacle. The media 306 also acts as a vent filter to filter any air entering the subassembly of funnel 300 and receptacle 302 through the port 312 in the bottom wall 314 of the receptacle.

The unified funnel 300 and receptacle 302 mount on the base in the same manner as in the embodiment of FIGS. 1–6.

It will be noted that the base 24 and all its parts are duplicated in the base of this embodiment.

THE EMBODIMENT OF FIGS. 8–11

Figure 8:
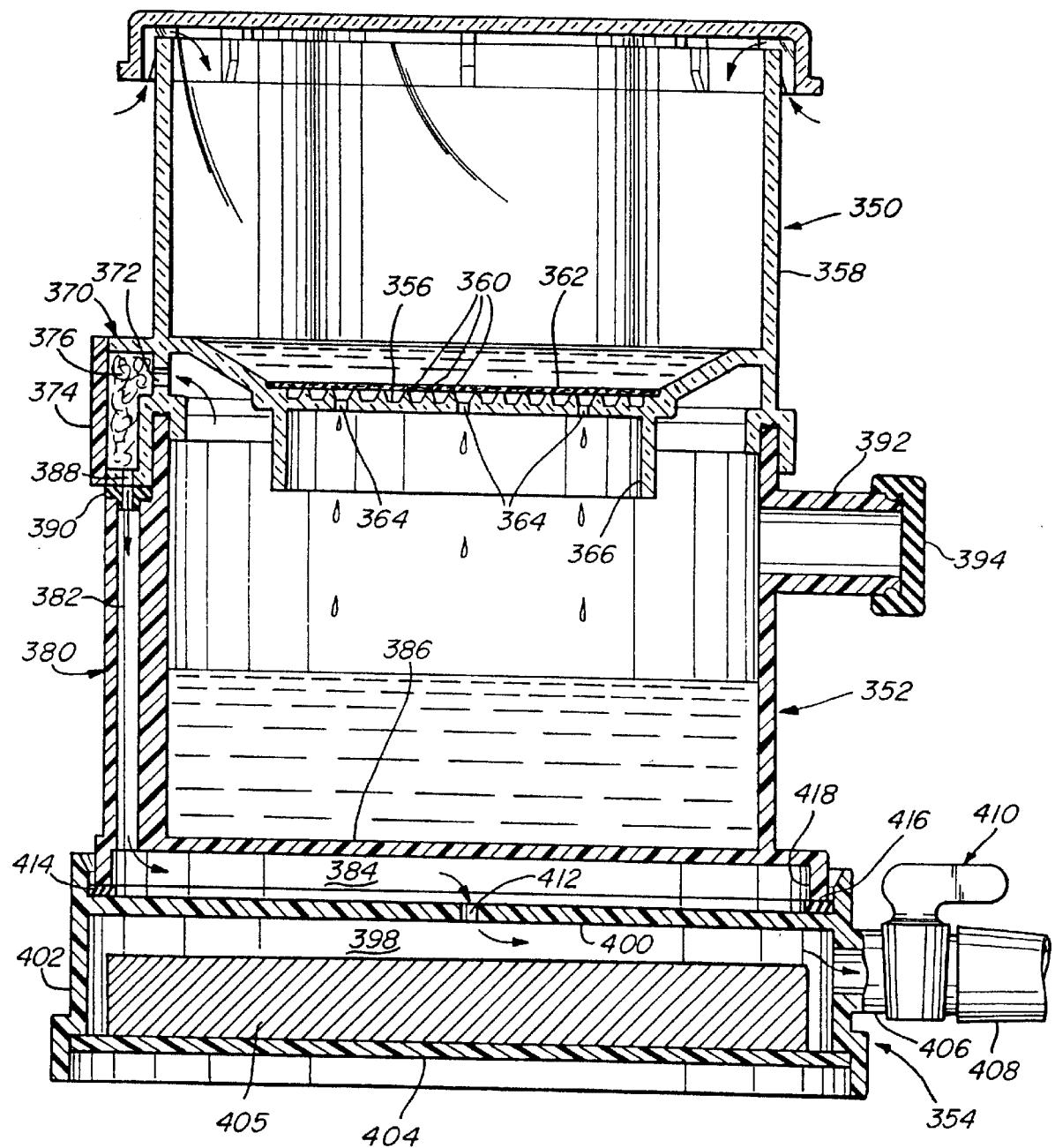
FIG. 8 is a cross-sectional elevation view of a third embodiment of the vacuum filtration device.

The assembly shown in FIGS. 8 and 9 is a further simplification of the embodiment shown in FIGS. 1–6 and 7. The assembly includes a funnel 350, filtration receptacle 352 and base 354. Each of these units is somewhat modified from the earlier embodiments. Funnel 350 includes a bottom wall 356 and cylindrical side wall 358 of the same general shape as the funnels in the earlier embodiments. Bottom wall 356 carries an array of pins 360 or other filter support structure that supports the membrane filter 362 in the manner described above. A number of ports 364 are provided in the bottom wall 356 that allow filtrate to pass from the funnel and beneath the membrane 362 to the receptacle 352. The ports 364 lie within the circumference of baffle 366 that extends downwardly from the flat central portion of bottom wall 356.

As shown in FIGS. 8 and 9, a small side chamber 370 is secured to the lower portion of the funnel 350. The small side chamber 370 communicates with the interior of the filter receptacle 352 through a port 372 in the lower portion of the side wall 358 of the funnel 350. The chamber 370 is closed by cover 374 and contains filtration media 376 which may be the same material as the media 306 and 148 in the earlier embodiments.

Unlike the filtration receptacles of the earlier embodiments, receptacle 352 does not include a center tube but rather a side tube 380 that may be formed as an integral part of the receptacle. The passage 382 in tube 380 is open at the bottom to the space 384 beneath bottom wall 386 of the receptacle, and the top of passage 382 communicates through port 388 with the interior of the side chamber 370. A seal 390 is provided where passage 382 registers with the port 388. Receptacle 352 includes a spout 392 and spout cover 394 as provided in the other embodiments.

A clear filtration receptacle cover 351 is shown in FIGS. 10 and 11. It is used to close the receptacle 352 when funnel 350 is removed. The flange 353 of receptacle cover 351 has cam slots 355 identical to the slots 357 in the funnel 350 and form with the cams 359 on the receptacle 352 a bayonet lock for receptacle cover 351 when it is used to close the receptacle 352.

The base 354 of this embodiment is a simplified version of the base 24 shown in the other embodiments. It will be noted in FIG. 8 that the valve housing 210, poppet valve 212, and spring 214 have all been eliminated. The base comprises a vacuum chamber 398 defined by the top wall 400, side wall 402, and bottom wall 404. A stabilizing weight 405 is disposed in the chamber. A nipple 406 is provided in the side wall 402 to which the vacuum hose 408 may be attached. Valve 410, preferably a three-way valve, is provided in the nipple 406 for connecting and disconnecting the vacuum to chamber 398. A port 412 is provided in the top wall 400 to connect the vacuum chamber 398 to the chamber 384 beneath the filtration receptacle 352.

A gasket 414 at the periphery of top wall 400 is positioned to engage the lower edge 416 of collar 418 provided on the bottom of receptacle 352. It will be appreciated that when the receptacle is placed on base 354 and the valve 410 is opened to evacuate the chamber 398, a low pressure region will be formed in chamber 384 beneath bottom wall 386 of receptacle 352 which will draw the receptacle tightly onto base 354.

The filtration device of FIGS. 8 and 9 functions in the same manner as the filtration devices of the earlier embodiments. However, the vacuum from vacuum chamber 398 is applied to the filtration receptacle 352 via chamber 384, passage 382, port 388, small side chamber 376 and port 372. Baffle 366 which extends downwardly from the bottom wall of the funnel will prevent filtrate entering the receptacle 352 from being drawn into the vacuum line.

THE EMBODIMENT OF FIGS. 12–14

Figure 12:
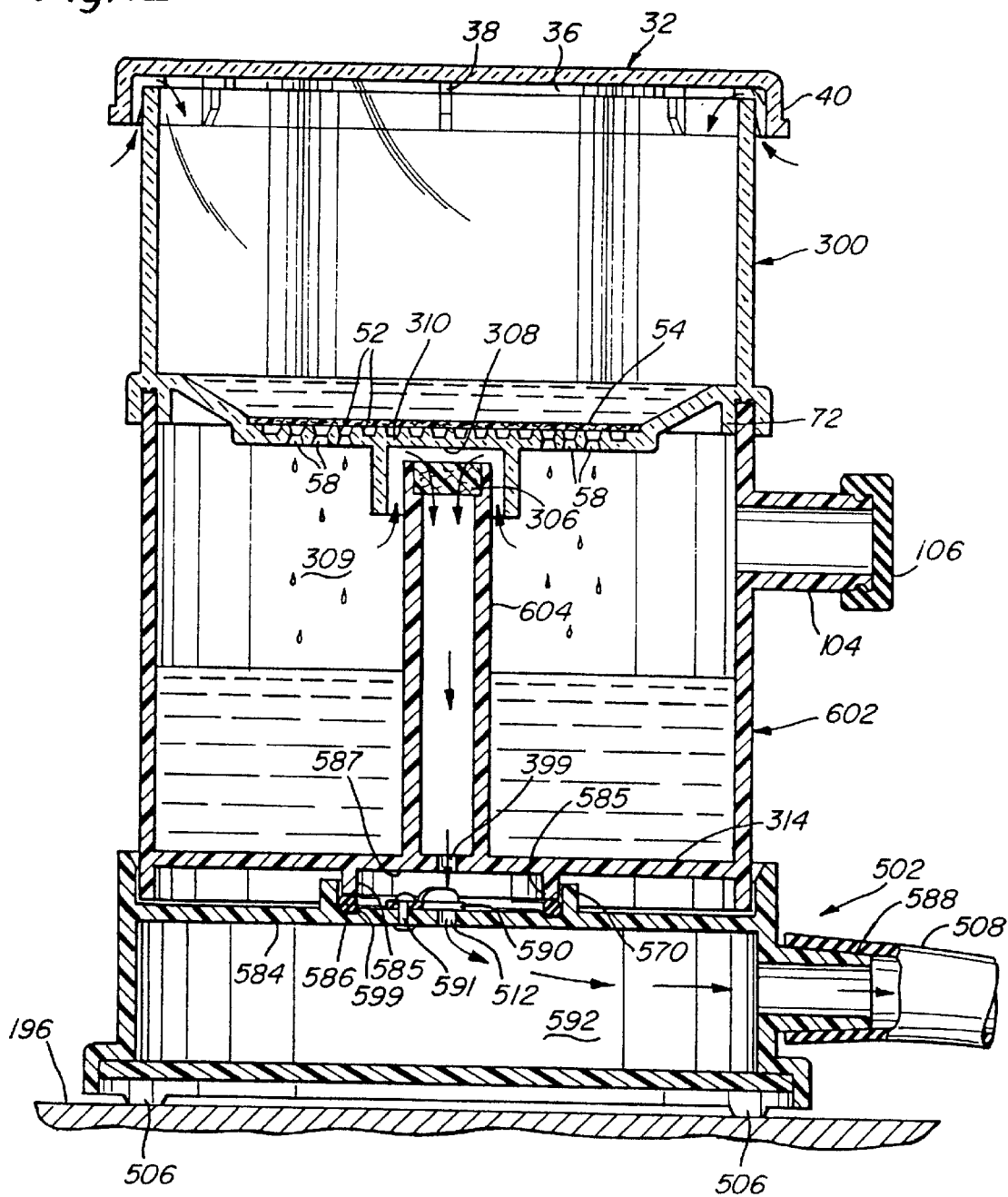
FIG. 12 is a cross-sectional elevation view of a fourth embodiment of the vacuum filtration device.
Figure 13:
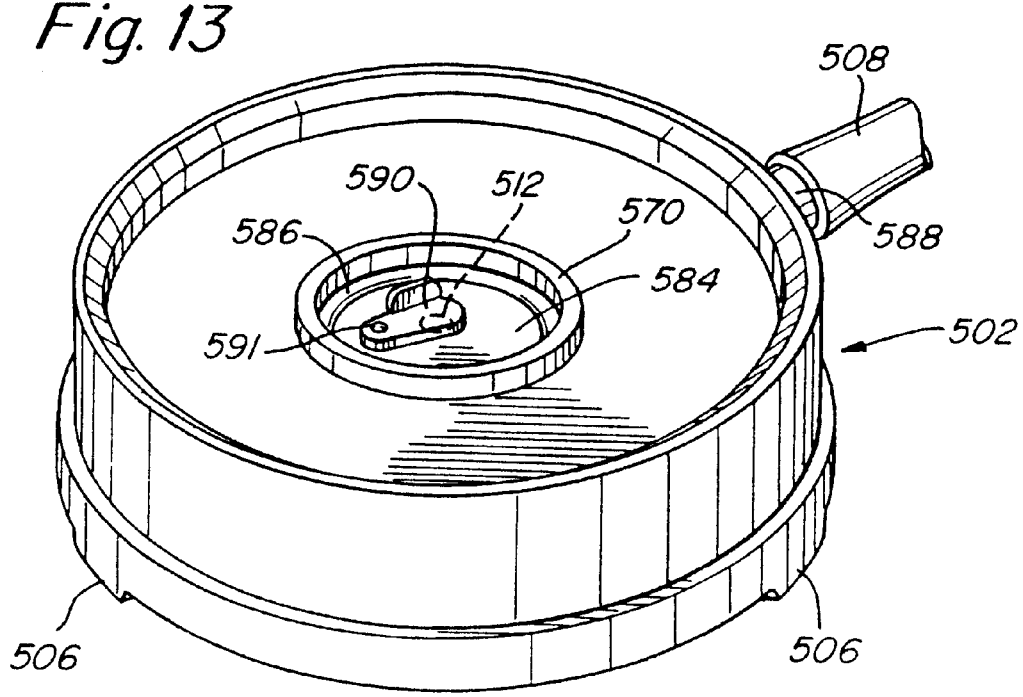
FIG. 13 is a perspective view of the base forming the lower unit of the assembly of FIG. 12 with the slide valve in the closed position.
Figure 14:
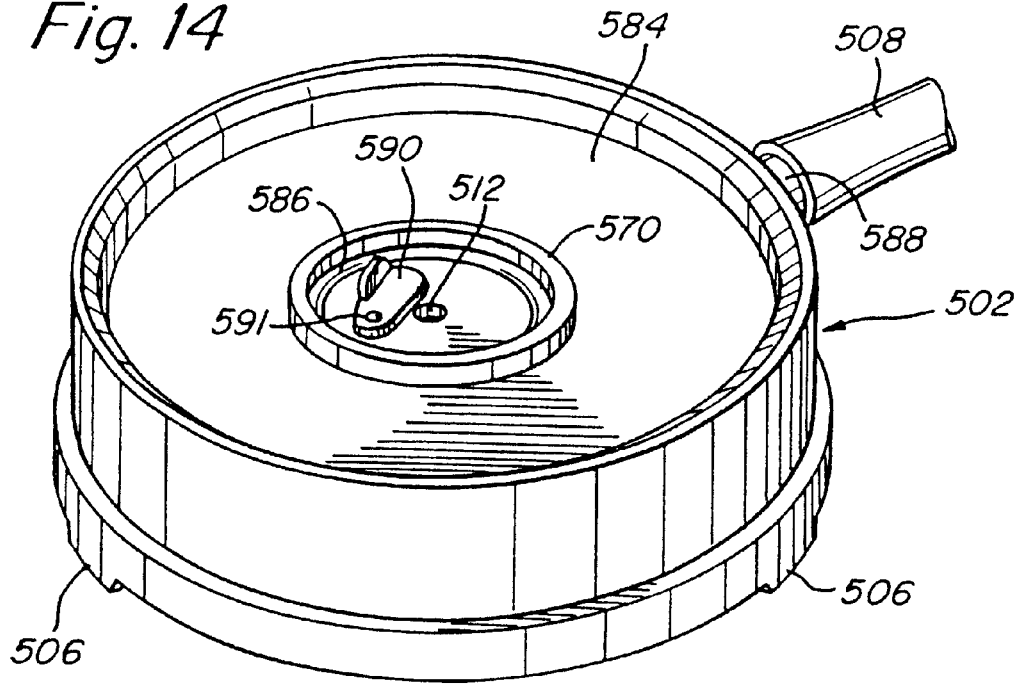
FIG. 14 is a perspective view of the base forming the lower unit of the assembly of FIG. 12 with the slide valve in the open position.

The assembly of FIG. 12 is a further simplification of the embodiments of FIGS. 1–6, 7 and 8–11. The assembly of FIG. 12 contains the same funnel-receptacle assembly as that illustrated in FIG. 7 with the exception that the small diameter collar 360 has been eliminated. The base 502 of this embodiment is similar to the base 354 shown in FIG. 8 with the exceptions that valve 410 and weight 405 have been eliminated, and O-ring groove 599, O-ring 586, slide valve 590, slide valve pivot 591 and three-leg support 506 have been added. FIG. 13 illustrates base 502 with slide valve 590 in the closed position. FIG. 14 illustrates base 502 with slide valve 590 in the open position.

Referring to FIGS. 12–14, chamber 592 of base 502 will be evacuated when vacuum is applied to base 502 via nipple 588 and vacuum hose 508. When slide valve 590 is in the closed position as illustrated in FIG. 13 there is no flow through port 512 of base 502. From FIGS. 13 and 14 it can be seen that slide valve 590 pivots about pivot pin 591. For best performance slide valve 590 should be made of a soft material such as polyethylene or a moldable rubber so that when slide valve 590 is in the closed position the force of vacuum applied to slide valve 590 via port 512 will pull down on slide valve 590 and force it to seal against top wall 584 of base 502 and hence seal port 512.

Referring to FIG. 12, when receptacle 602 is placed onto base 502, inner collar 585 of receptacle 602 seals against O-ring 586. The surface area 587 inside inner collar 585 is chosen so that when vacuum is applied to it via port 512 of base 502 enough force will be applied to surface area 587 to firmly hold receptacle 602 in place on base 502 but not so large as to make it difficult for a user to remove the receptacle-funnel assembly from base 502 without turning off the vacuum source.

The system illustrated in FIG. 12 operates in the following manner. With the slide valve 590 in the open position and vacuum applied to base 502 via vacuum hose 508, the user places a receptacle-funnel assembly 602 onto base 502. The user then removes dust cover 32 from funnel 300 to add liquid to be filtered to funnel 300. The user then replaces dust cover 32. Once liquid is placed into funnel 300 air flow ceases through membrane filter 54 and the inside of receptacle 602 becomes evacuated via port 399 and the center tube 604. It may be necessary for the operator to momentarily push down of the receptacle-funnel assembly to assure that a good seal is made between inner collar 585 and O-ring 586. When the filtration is complete the operator simply removes the receptacle-funnel assembly from base 502.

Rim 570 on the upper surface of the top wall 584 of base 502 insures that O-ring 586 remains in place when the receptacle-funnel assembly is removed from base 502 with the vacuum "on". The inside diameter of rim 570 is chosen so that inner collar 585 will be a loose fit within rim 570. Rim 570 works as follows; as the receptacle-funnel assembly is removed from base 502 with vacuum "on", the O-ring 586 may lift with the receptacle-funnel assembly until the vacuum lock is broken. Rim 570 insures that the O-ring 586 will fall back into the O-ring groove 599. A deep O-ring groove which will accommodate the O-ring and inner collar 585 will accomplish the same result.

If another filtration is to be performed immediately, another receptacle-funnel assembly is placed onto the base 502 and the process is repeated. If it is not desired to perform another filtration, slide valve 590 can be pushed to the closed position or the vacuum source can be turned off.

Three point support 506 consists of 3 feet molded in base 502 and spaced 120° apart. This type of support will compensate for any unevenness in surface 196.

THE EMBODIMENT OF FIG. 15

Figure 15:
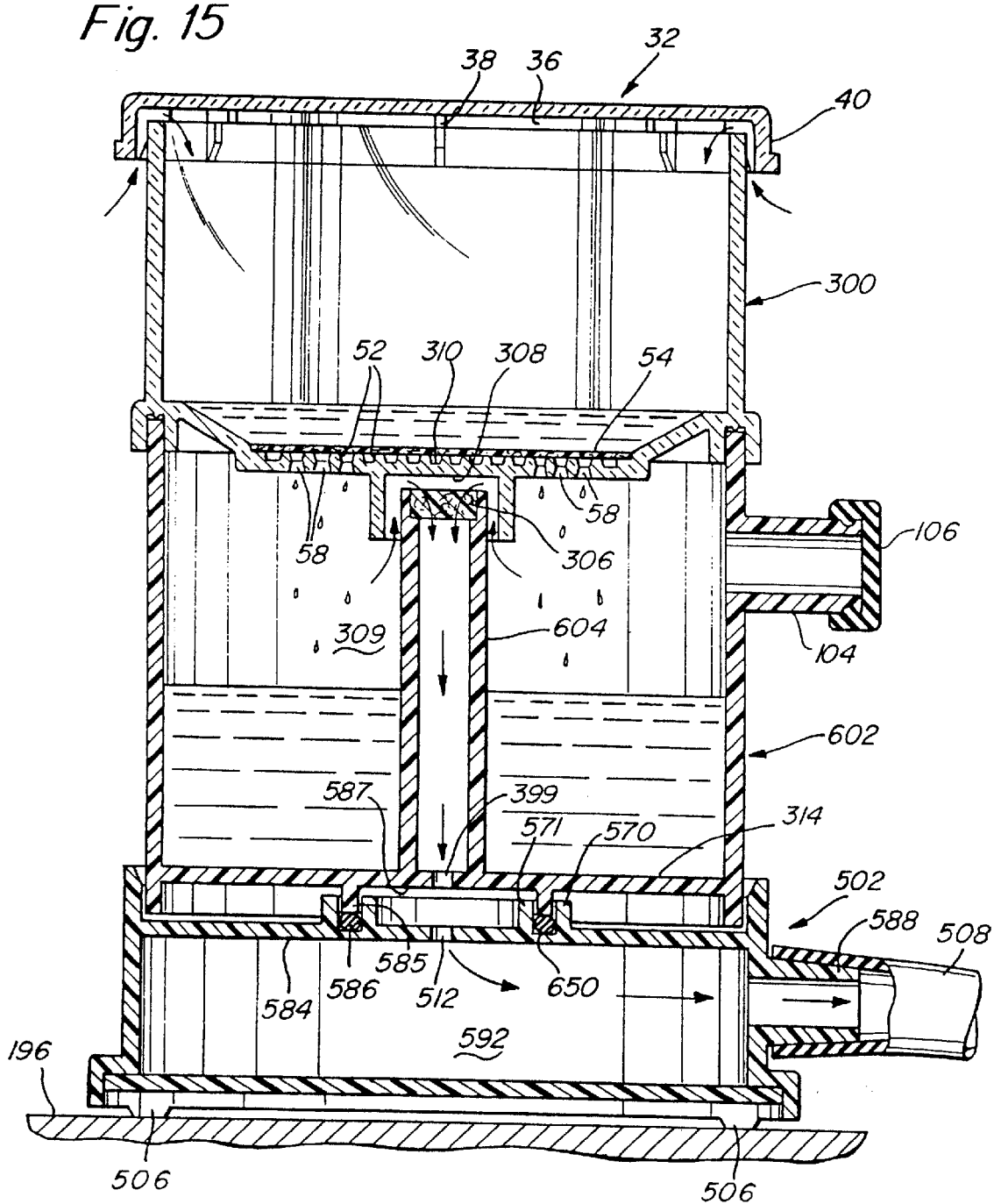
FIG. 15 is a cross-sectional elevation view of a fifth embodiment of the vacuum filtration device.

A further simplification of the embodiment of FIG. 12 is illustrated in FIG. 15. This embodiment is the same as that in FIG. 12 with the exception that slide valve 590 and pivot pin 591 have been eliminated. This embodiment also employs a deep O-ring groove 650 as mentioned above, in place of the groove 599. The deep O-ring groove 650 is formed by the rim 570 and the inner rim 571. This embodiment works the same as the embodiment of FIG. 12 with the exception that the vacuum must be turned on and off at the vacuum source. If, however, repetitive filtrations are being performed there is no need to turn the vacuum source on and off. The user would simply remove a device from the base once a filtration is complete and then replace it with another without turning the vacuum source off.

THE EMBODIMENT OF FIGS. 16–17

Figure 16:
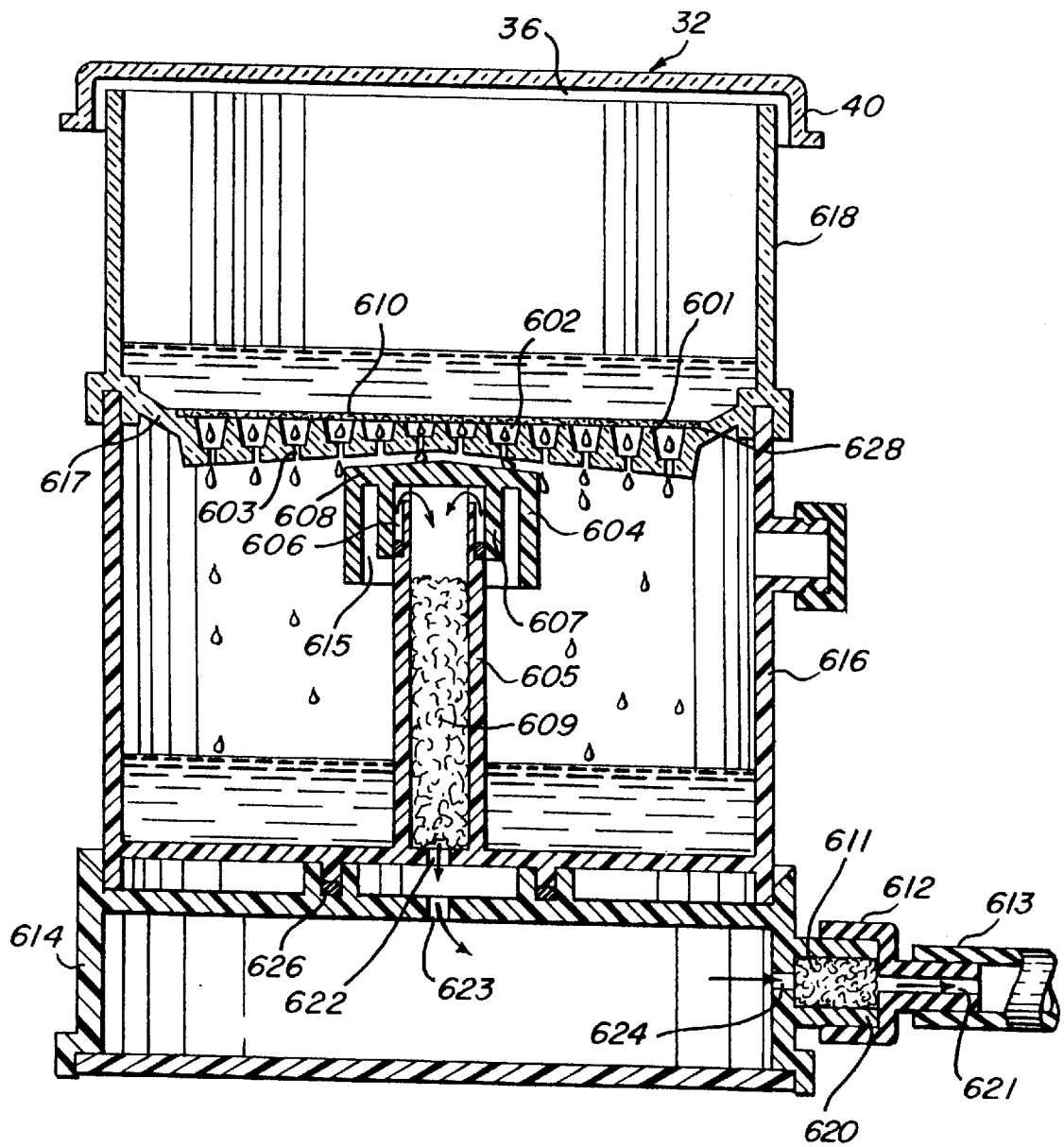
FIG. 16 is a cross-sectional elevation view of a sixth embodiment of the liquid filtration device.
Figure 17:
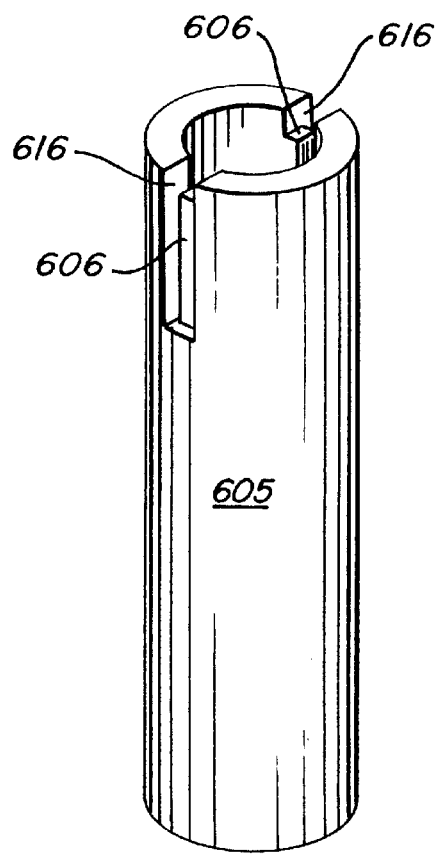
FIG. 17 is a perspective view of the center tube of the filtration receptacle of the assembly shown in FIG. 16.

Another embodiment of the invention is illustrated in FIG. 16. The baffle employed in this embodiment differs from those previously described. In FIG. 16, a baffle 608 is attached to the top of center tube 605. Baffle 608 contains inner ring 607 and outer ring 604. The inner and outer rings are separated by gap 615. Inner ring 607 slides over the top of center tube 605 and may or may not be sealed to center tube 605. Center tube 605 has one or several slots 606 at the top of center tube 605. FIG. 17 illustrates center tube 605 and two slots 606 in greater detail. At the top of the slots 606, the opening 616 extends through the wall of center tube 605. FIG. 16 illustrates the top of baffle 608 and bottom wall 617 of funnel 618 as being sloped outward. These surfaces could also be flat. Bottom wall 617 of funnel 618 could also slope inward. Bottom wall 617 of funnel 618 carries an array of filter support pins 601 or other support structure designed to support membrane filter 610 which rests on this support. As in previous embodiments, the membrane is sealed to shoulder 628 by heat seal or other means.

Because baffle 608 in FIG. 16 covers the top of center tube 605, it is possible to have openings 603 in bottom wall 617 of funnel 618 directly above center tube 605. This means that openings 603 can be placed uniformly under membrane filter 610, thus minimizing pressure drop due to flow in-between support pins 601. Any liquid that drops onto the top surface of baffle 608 will run off the top surface and flow down the outside of baffle outer ring 604, and then into receptacle 616. Gap 615 between outer ring 604 and inner ring 607 of baffle 608 prevents liquid from entering center tube 605 via slots 606. As an added safety precaution, outer ring 604 extends below the bottom of slots 606.

Center tube 605 contains filtration media 609, as described above. Filtration media 611 also is present in port 620 of base 614. Filtration media 611 prevents aerosols or other contaminants from entering vacuum hose 613. To prevent filtration media 611 from being sucked into vacuum hose 613, vacuum hose adaptor 612 is provided with a small outlet opening 621. Variations of this embodiment include center tube 605 having filtration media 609 with no filtration media 611 in port 620, or port 620 having filtration media 611 with no filtration media 609 in center tube 605. In the case where there is no filtration media 609 in center tube 605, even though there is filtration media 611 in port 620, sterility of the filtrate in receptacle 616 cannot be guaranteed for at least two reasons. First, when filtration is complete and the vacuum source is turned off as the void space in receptacle 616 approaches atmospheric pressure, the seal between receptacle 616 and O-ring 626 may be broken before the inside of receptacle 616 reaches atmospheric pressure. This will cause outside unsterile air to enter center tube 605 through opening 622. The situation will be exacerbated if receptacle 616 is removed from vacuum base 614 while the vacuum is on. Second, when receptacle 616 is removed from vacuum base 614, there will be an unfiltered passage between the inside of receptacle 616 and the outside atmosphere via opening 622, center tube 605 and slots 606.

When vacuum is applied to vacuum hose 613, the base 614 is evacuated through filtration media 611. This in turn evacuates filtration receptacle 616. In this embodiment, air flows from filtration receptacle 616 through slots 606, into center tube 605, through filtration media 609, and then through openings 622 and 623 into base 614 and then out through opening 624, through filtration media 611, through opening 621 and finally through vacuum hose 613.

THE EMBODIMENT OF FIGS. 18–19

Figure 18:
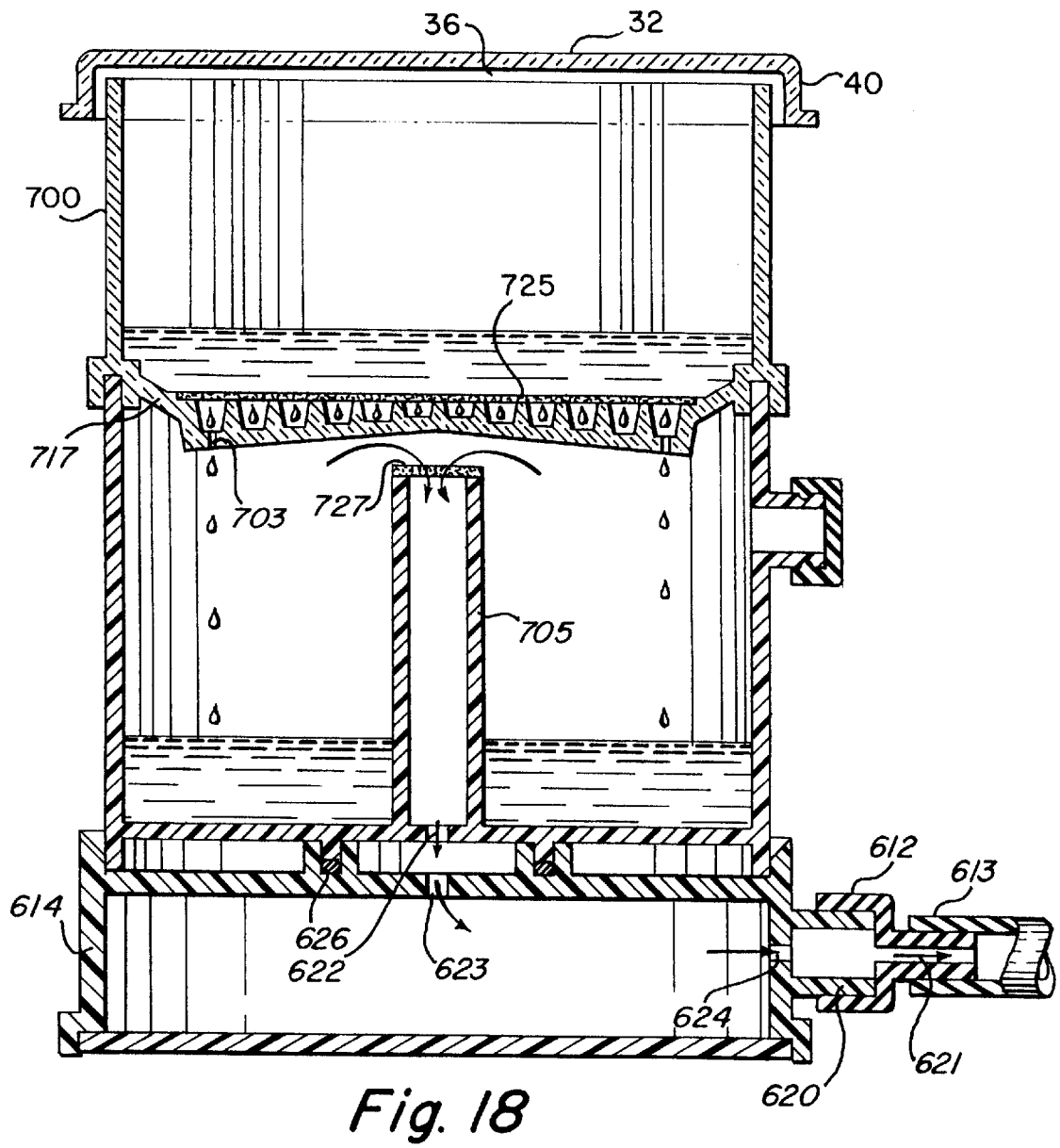
FIG. 18 is a cross-sectional elevation view of a seventh embodiment of the liquid filtration device.

FIG. 18 illustrates yet another embodiment of the invention. In this embodiment, filtration media 609 in center tube 605 of FIG. 16 is replaced with filter 727 which is heat sealed, ultrasonically sealed or otherwise sealed to center tube 705. Filter 727 can be hydrophobic or hydrophilic. Preferably, filter 727 is a 0.2 μm hydrophobic membrane filter.

Figure 19:
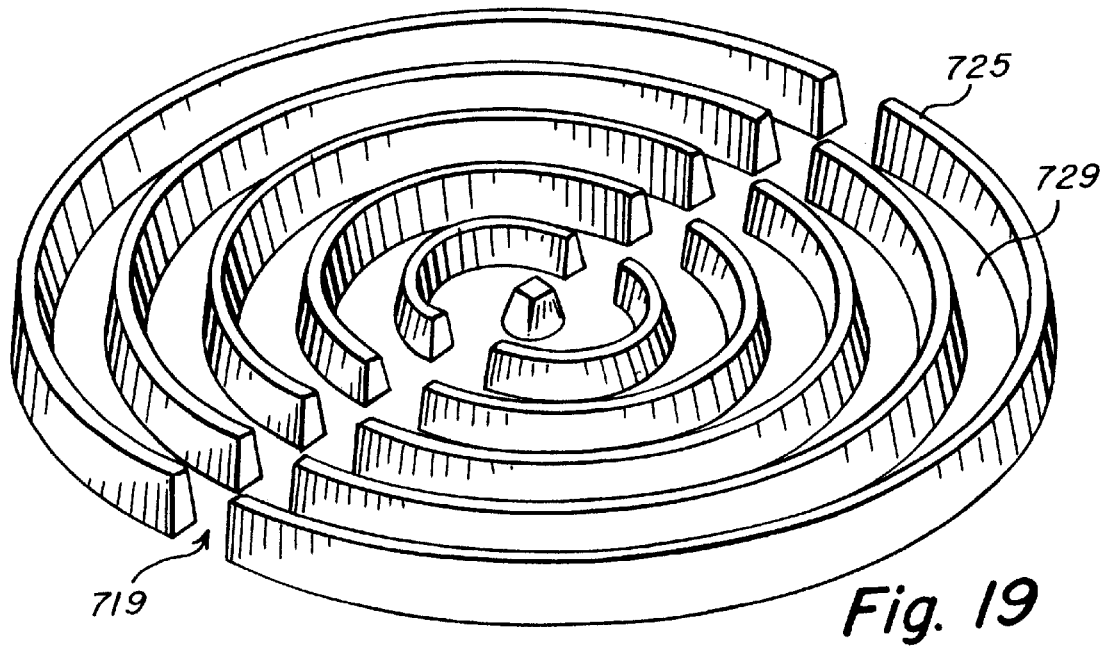
FIG. 19 is a perspective view of the filter support ribs of the funnel of the assembly shown in FIG. 18.

In this embodiment, the means for preventing the vacuum applied to the base from sucking filtrate which enters the filtration receptacle into the base comprises a certain configuration of slots in the funnel 700. Bottom wall 717 of funnel 700 has openings 703 only around the periphery of bottom wall 717. The position of these openings, combined with the outward sloping bottom wall 717 prevents filtrate from entering center tube 705. Since with this configuration, openings 703 only appear around the outside of bottom wall 717, it is necessary to have communication between the inner filter support ribs 725 and peripheral openings 703. In one embodiment, illustrated in FIG. 19, channels 729 in between concentric filter support ribs 725 are connected via center channel 719.

Another aspect of the invention features a funnel/receptacle filtration module which includes a disposable filtration receptacle and a disposable funnel. The receptacle and funnel may consist of any embodiment for these elements that has previously been described for the vacuum filtration device.

From the foregoing description many of the advantages of the present system will be readily appreciated. With each of the embodiments of this invention, the device or module may be supplied to the user with the filter funnel attached to the receptacle and with the pouring spout cover attached to the pouring spout. This assembly may be supplied in a sterile condition in a sealed pouch used for such purposes. The user would then simply remove the pre-sterilized assembled unit from the sealed pouch, place it on the base, add the liquid to be filtered and perform the filtration.

With the embodiments of FIGS. 1 and 8 the sterile filtrate may be stored in the sterile state by removing the funnel from the receptacle and placing a pre-sterilized receptacle cover on the receptacle. To assure sterility this operation should be performed in a laminar flow hood.

In the embodiment of FIGS. 1–6 the receptacle cover 170 does not have a key 82 in its bottom surface and hence it will not open the cylinder valve 84 when placed on the receptacle.

In the embodiment of FIG. 8 the side chamber 370 is removed from the receptacle when the funnel 350 is removed. Hence it is not necessary to have a valve to close port 382 since port 382 is only connected to the interior of the receptacle 352 when the funnel 350 is locked in place on top of receptacle 352. As in the embodiment of FIGS. 1–6, the embodiment of FIG. 8 will maintain filtrate in the sterile state for storage when the receptacle cover is placed onto the receptacle. To assure sterility this operation should be performed in a laminar flow hood.

In each of the embodiments of the present invention, the base through which the vacuum is supplied to the filtration receptacle has its vacuum hose connected very close to the surface on which the base rests. The weight in the base adds stability to it, and is sufficient to prevent the assembly from accidentally falling over.

When using the base 24 as part of the filtration assembly, a person desiring to perform a filtration with a disposable funnel and receptacle has simply to place the device on the reusable base 24, pour liquid to be filtered into the funnel, place the vented funnel cover 32 on it, and push down on the assembly momentarily. The vacuum will automatically be applied to the device through the poppet valve 212, and filtration will commence. When the filtration is completed, the person simply removes the disposable device from the reusable base 24, and the poppet valve 212 will close.

Having described this invention in detail, those skilled in the art will appreciate that numerous modifications may be made thereof without departing from the spirit of this invention. Therefore, it is not intended that the breadth of this invention be limited to the specific embodiments illustrated and described. Rather, its breadth is to be determined by the appended claims and their equivalents.

I claim:
1. A vacuum filtration device comprising:
  a disposable filtration receptacle for receiving filtrate,
  a disposable funnel having a first filter therein for receiving the liquid to be filtered,
  said funnel being disposed above said filtration receptacle and having openings below said first filter for directing filtrate from said funnel to said filtration receptacle,
  a reusable base releasably supporting said filtration receptacle and having an opening through which a vacuum may be applied to said base,
  said base being disposed below said filtration receptacle and being operatively connected to the interior of said filtration receptacle so that the vacuum of said base may be applied to said filtration receptacle to draw liquid from said funnel through said filter into said filtration receptacle, and
  means for preventing the vacuum applied to said base from sucking the filtrate which enters said filtration receptacle into said base.
2. The vacuum filtration device as defined in claim 1 wherein said means comprises a barrier.
3. The vacuum filtration device, as defined in claim 2 wherein said barrier comprises a baffle.
4. The vacuum filtration device as defined in claim 2 wherein said barrier is carried by said funnel.

5. The vacuum filtration device as defined in claim 2 wherein said barrier is carried by said filtration receptacle.

6. The vacuum filtration device as defined in claim 1 wherein said openings comprise a configuration of slots in a portion of the periphery of said funnel,
and wherein said means for preventing the vacuum applied to said base from sucking filtrate which enters said filtration receptacle into said base comprises said configuration of slots.

7. The vacuum filtration device as defined in claim 1 wherein the operative connection includes a passage connecting said filtration receptacle to said base.

8. The vacuum filtration device as defined in claim 7 further comprising a valve in said passage,
said valve open to operatively connect said base to said filtration receptacle when said filtration receptacle is disposed on said base.

9. The vacuum filtration device as defined in claim 1 wherein the operative connection between said base and said filtration receptacle includes filtration media.

10. The vacuum filtration device as defined in claim 1 wherein said filtration receptacle comprises a pour spout.

11. The vacuum filtration device as defined in claim 1 further comprising a low pressure line operatively connected to said opening of said base for applying a vacuum thereto.

12. The vacuum filtration device as defined in claim 11 wherein the operative connection between said low pressure line and said base includes filtration media.

13. The vacuum filtration device as defined in claim 1 wherein said funnel is integral with said filtration receptacle.

14. The vacuum filtration device as defined in claim 1 wherein said funnel is held above said filtration receptacle by a connection formed by a vacuum which is applied to said base through said opening of said base.

15. The vacuum filtration device as defined in claim 1 wherein said base supports said filtration receptacle by a connection formed by a vacuum which is applied to said base through said opening of said base.

16. The vacuum filtration device as defined in claim 1 wherein said base is weighted to provide stability for said base when said filtration receptacle and said funnel are mounted thereon.

17. The vacuum filtration device as defined in claim 1 wherein the operative connection includes a tube connecting said filtration receptacle to said base, said tube being disposed inside said filtration receptacle.

18. The vacuum filtration device as defined in claim 17 wherein said tube is integral with said filtration receptacle.

19. The vacuum filtration device as defined in claim 17 further comprising a second filter, said second filter being disposed above said tube and sealed to said tube.

20. The vacuum filtration device as defined in claim 1 wherein said operative connection includes a tube connecting said filtration receptacle to said base, said tube being disposed on the outside of said filtration receptacle.

21. The vacuum filtration device as defined in claim 20 wherein said filtration receptacle and said funnel are made of a molded plastic material and said filtration receptacle has bottom and side walls,
and wherein said tube is integral with and disposed on the outside of said wall of said filtration receptacle.

22. The vacuum filtration device as defined in claim 20 wherein a side chamber is connected to the top of said tube and connects said tube to the interior of said filtration receptacle.

23. The vacuum filtration device as defined in claim 22 wherein said side chamber is integral with said funnel and disconnects the top of said tube from the interior of said filtration receptacle when said funnel is removed from said filtration receptacle.

24. The vacuum filtration device as defined in claim 22 wherein said side chamber contains filtration media.

25. A vacuum filtration device comprising:
a disposable filtration receptacle for receiving filtrate,
a disposable funnel having a first filter therein for receiving the liquid to be filtered,
said funnel being disposed above said filtration receptacle and having openings below said first filter for directing filtrate from said funnel to said filtration receptacle, and
a reusable base releasably supporting said filtration receptacle and having an opening through which a vacuum may be applied to said base,
said base being disposed below said filtration receptacle and being operatively connected to the interior of said filtration receptacle so that the vacuum of said base may be applied to said filtration receptacle to draw liquid from said funnel through said filter into said filtration receptacle,
the operative connection between said base and said filtration receptacle including filtration media.

26. The vacuum filtration device as defined in claim 25 wherein said funnel is integral with said filtration receptacle.

27. The vacuum filtration device as defined in claim 25 wherein said funnel is held above said filtration receptacle by a connection formed by a vacuum which is applied to said base through said opening of said base.

28. The vacuum filtration device as defined in claim 25 wherein said base supports said filtration receptacle by a connection formed by a vacuum which is applied to said base through said opening of said base.

29. The vacuum filtration device as defined in claim 25 further comprising a low pressure line operatively connected to said opening of said base for applying a vacuum thereto.

30. The vacuum filtration device as defined in claim 29 wherein the operative connection between said low pressure line and said base includes filtration media.

31. The vacuum filtration device as defined in claim 25 wherein said filtration receptacle comprises a pour spout.

32. The vacuum filtration device as defined in claim 25 further comprising means for preventing the vacuum applied to said base from sucking the filtrate which enters said filtration receptacle into said base.

33. The vacuum filtration device as defined in claim 32 wherein said means comprises a barrier.

34. The vacuum filtration device as defined in claim 33 wherein said barrier is carried by said funnel.

35. The vacuum filtration device as defined in claim 34 wherein said poppet-type valve is mounted in said base and closes to seal said base when said filtration receptacle is removed from said base.

36. The vacuum filtration device as defined in claim 33 wherein said barrier is carried by said filtration receptacle.

37. The vacuum filtration device as defined in claim 32 wherein said barrier comprises a baffle.

38. The vacuum filtration device as defined in claim 32 wherein said openings comprise a configuration of slots in a portion of the periphery of said funnel,
and wherein said means for preventing the vacuum applied to said base from sucking filtrate which enters said filtration receptacle into said base comprises said configuration of slots.

39. The vacuum filtration device as defined in claim 25 wherein the operative connection includes a passage connecting said filtration receptacle to said base.

40. The vacuum filtration device as defined in claim 39 wherein a poppet-type valve is disposed in said passage between said base and said filtration receptacle interior and means are carried by said filtration receptacle for opening said poppet-type valve when said filtration receptacle is placed on said base.

41. The vacuum filtration device as defined in claim 39 wherein
   a valve is disposed in said passage between said base and said filtration receptacle interior for opening and closing said passage,
   and means interconnecting said valve and said funnel enabling said valve to be opened and closed in response to movement of said funnel on said filtration receptacle.

42. The vacuum filtration device as defined in claim 41 wherein said valve is a cylinder valve which opens and closes in response to rotation of said funnel on said filtration receptacle.

43. The vacuum filtration device as defined in claim 42 wherein said passage includes a tube extending upwardly in said filtration receptacle and said cylinder valve is mounted in the top of said tube, and the means interconnecting said cylinder valve and said funnel comprises a key in the bottom of said funnel engaging a slot in said cylinder valve for causing rotation of said funnel on said filtration receptacle to open and close said cylinder valve.

44. The vacuum filtration device as defined in claim 41 wherein said passage includes a tube extending upwardly from the bottom of said filtration receptacle and wherein said valve is disposed in the top of said tube, and wherein said filtration media is mounted in said tube.

45. The vacuum filtration device as defined in claim 39 wherein said passage includes a tube connecting said filtration receptacle to said base, and further comprising a second filter, said second filter being disposed above said tube and sealed to said tube.

46. The vacuum filtration device as defined in claim 39 wherein said filtration receptacle has side and bottom walls,
   and wherein said passage includes a tube carried on said side wall of said filtration receptacle, a port in said base, and a side chamber carried by said funnel.

47. The vacuum filtration device as defined in claim 46 wherein said side chamber contains filtration media.

48. The vacuum filtration device as defined in claim 47 wherein a barrier is disposed in said filtration receptacle for preventing filtrate that is moving from said funnel to said filtration receptacle from entering said side chamber.

49. The vacuum filtration device as defined in claim 48 wherein said side chamber is integral with said funnel and disconnects the top of said tube from the interior of said filtration receptacle when said funnel is removed from said filtration receptacle.

50. The vacuum filtration device as defined in claim 46 wherein said side chamber connects the top of said tube to said filtration receptacle.

51. The vacuum filtration device as defined in claim 25 wherein attaching means are provided in said base and responsive to the vacuum for anchoring said base to a horizontal surface.

52. A funnel/receptacle filtration module comprising:
   a disposable filtration receptacle for receiving filtrate and suitable for being disposed above a base connected to a vacuum source,
   said filtration receptacle having an aperture in the bottom for providing a passage between said filtration receptacle and the base when said filtration receptacle is disposed above the base,
   a disposable funnel having a first filter therein for receiving the liquid to be filtered,
   said funnel being disposed above said filtration receptacle and having openings below said first filter for directing filtrate from said funnel to said filtration receptacle, and
   means for preventing filtrate that is moving from said funnel to said filtration receptacle from entering the base when said filtration receptacle is disposed above the base.

53. The filtration module as defined in claim 52 wherein said means comprises a barrier.

54. The filtration module as defined in claim 53 wherein said barrier is carried by said funnel.

55. The filtration module as defined in claim 53 wherein said barrier is carried by said filtration receptacle.

56. The filtration module as defined in claim 52 wherein said barrier comprises a baffle.

57. The filtration module as defined in claim 52 wherein said openings comprise a configuration of slots in a portion of the periphery of said funnel,
   and wherein said means for preventing filtrate that is moving from said funnel to said filtration receptacle from entering the base when said filtration receptacle is disposed above the base comprises said configuration of slots.

58. The filtration module as defined in claim 52 wherein said funnel is integral with said filtration receptacle.

59. The filtration module as defined in claim 52 wherein said filtration receptacle includes a tube extending upwardly, said tube forming a passage between said filtration receptacle and the base when said filtration receptacle is disposed above the base.

60. The filtration module as defined in claim 59 wherein said tube includes filtration media.

61. The filtration module as defined in claim 59 further comprising a second filter, said second filter being disposed above said tube and sealed to said tube.

62. The filtration module as defined in claim 52 wherein said filtration receptacle comprises a pour spout.

63. A funnel/receptacle filtration module comprising:
   a disposable filtration receptacle for receiving filtrate and suitable for being disposed above a base connected to a vacuum source,
   said filtration receptacle having an aperture in the bottom for providing a passage between said filtration receptacle and a base when said filtration receptacle is disposed above the base,
   a tube extending upwardly in the filtration receptacle disposed above said aperture, said tube including filtration media, and
   a disposable funnel having a filter therein for receiving the liquid to be filtered,
   said funnel being disposed above said filtration receptacle and having openings below said filter for directing filtrate from said funnel to said filtration receptacle.

64. The filtration module as defined in claim 63 wherein said funnel is integral with said filtration receptacle.

65. The filtration module as defined in claim 63 wherein said filtration receptacle comprises a pour spout.

* * * * *